United States Patent [19]

Yoda et al.

[11] Patent Number: 4,621,018

[45] Date of Patent: Nov. 4, 1986

[54] MAGNETIC RECORDING MEDIUM

[75] Inventors: Kuniichi Yoda; Kaoru Kawasaki, both of Saku, Japan

[73] Assignee: TDK Corporation, Tokyo, Japan

[21] Appl. No.: 701,620

[22] Filed: Feb. 14, 1985

[30] Foreign Application Priority Data

Feb. 14, 1984 [JP] Japan .................. 59-24305

[51] Int. Cl.$^4$ .............................................. G11B 5/70
[52] U.S. Cl. .................................. 428/329; 252/62.54;
252/62.56; 360/134; 360/135; 360/136;
427/128; 428/328; 428/336; 428/694; 428/900
[58] Field of Search .............. 428/425.9, 694, 900,
428/328, 329, 336; 427/128; 252/62.54, 62.56;
360/134-136

[56] References Cited

U.S. PATENT DOCUMENTS 4,361,627 11/1982 Ohata ............................ 428/425.9
4,400,435 8/1983 Yoda ................................ 428/692

Primary Examiner—Ellis P. Robinson
Attorney, Agent, or Firm—Oblon, Fisher, Spivak, McClelland & Maier

[57] ABSTRACT

A magnetic recording medium comprising a transparent support and a magnetic layer formed on the support, said magnetic layer comprising Co-adsorbed $Fe_3O_4$ and Co-adsorbed $\gamma$-$Fe_2O_3$ in a weight ratio of from 40:60 to 80:20, each of said Co-adsorbed $Fe_3O_4$ and Co-adsorbed $\gamma$-$Fe_2O_3$ having a particle size of at least 25 m$^2$/g as a BET value.

2 Claims, 4 Drawing Figures

MAGNETIC RECORDING MEDIUM

BACKGROUND OF THE INVENTION

1. Field of the Invention

The present invention relates to a magnetic recording medium, and particularly to an improvement of a magnetic recording medium of the type wherein a magnetic layer is coated on a transparent plastic base film.

2. Description of the Background

In recent years, home video recorders such as compact ½ inch home video tape recorders have become popular and have been spreading at a rapid rate. As the name "home video recorders" implies, such magnetic recording and reproducing devices are intended primarily for use at home and designed for easy operation. For instance, a home video recorder is designed so that in the operation of a magnetic tape mounted thereon for recording, reproducing, fast-forwarding or rewinding, the magnetic tape stops running when it reaches the end of the tape. Namely, such a home video recorder is provided with a means for detecting a light transmitted through a transparent leader tape portion provided at the end of the magnetic tape, and thus is designed to stop the tape from running upon detection of the transmitted light. The means for detecting the transmitted light is likely to detect also lights from other light sources than that of the home video recorder. Therefore, the light detecting means is so designed that it does not operate unless it detects a substantial quantity of light. For instance, if the magnetic tape is adapted to stop running when the photo transistor current due to the light transmitted through the magnetic tape is as low as about 1 μA, there will be frequent accidental stopping of the running tape upon the detection of lights from light sources other than the home video recorder even when the quantity of lights transmitted through the magnetic tape is relatively small. Accordingly, the magnetic tape is so adapted that it does not stop running until the photo transistor current due to the light transmitted through the magnetic tape reaches a level of about 3 μA. Accordingly, the magnetic tape must be designed so that the light will not be transmitted through the magnetic recording and reproducing portion. For this purpose, there may be (1) a method wherein the magnetic layer serving to prevent the transmittance of light to a certain degree, is made thick, (2) a method wherein the base film for the magnetic tape is made not to transmit a light, or (3) a method wherein a substance inhibiting the transmission of light is incorporated in a substantial amount in the magnetic layer so that it is effective even when the magnetic layer is relatively thin. Among these methods, method (1) has a drawback that when the magnetic layer is made thick, the loss in the recording efficiency due to the diamagnetic field becomes great. Further, if the magnetic tape is made thick, it is required to take a large space for its accommodation. Accordingly, in the case of a home video recorder having a relatively compact structure, the thickness of the magnetic tape can not be made so thick. Therefore, if the magnetic layer is made thick and the base film is made thin, the toughness of the magnetic tape decreases, whereby there will be a drawback that the magnetic tape is susceptible to rupture or deformation. In the case of method (2), carbon powder or the like maay be incorporated in the base film. However, it is rather difficult to prepare a base film wherein carbon powder is uniformly distributed. It has an additional drawback that the production cost will be high. With respect to method (3), it has been proposed to incorporate a substantial amount of carbon powder in the magnetic layer. However, in order to adequately inhibit the transmittance of light by means of e.g. carbon powder, it is required to incorporate at least about 10% by weight of carbon powder relative to the magnetic powder such as $\gamma$-$Fe_2O_3$, and otherwise no adequate effectiveness is obtainable. However, if a substantial amount of carbon powder is employed, the S/N ratio of the magnetic tape deteriorates substantially. If a magnetic tape is prepared by using hardly light-transmitting $Fe_3O_4$ instead of $\gamma$-$Fe_2O_3$ as the magnetic powder, the $Fe_3O_4$ is unstable to a temperature and susceptible to oxidation. Therefore, $Fe_3O_4$ was not desirable as the magnetic powder for a magnetic recording medium. Further, for the video tapes, high density recording and long hour recording are required, and there is a tendency such that the magnetic powder is required to be finer and the tape is required to be thinner, i.e. the tendency is adverse to the inhibition of the transmittance of light. Namely, Co-containing $\gamma$-$Fe_2O_3$ is commonly used for the video tapes, and if the particle size is made finer, the transmittance of light increases, and the transmittance further increases by making the video tape thinner.

SUMMARY OF THE INVENTION

The present invention provides a magnetic recording medium having a sufficiently low light transmittance and good electromagnetic characteristics, particularly suitable for high density recording.

The present invention provides a magnetic recording medium comprising a transparent plastic base film and a magnetic layer formed thereon with a magnetic powder dispersed in a resin binder which reduces, the light transmittance of the magnetic layer sufficiently to a level suitable for automatic operation utilizing the detection of light, while maintaining the electromagnetic characteristics at an adequately high quality level.

DESCRIPTION OF THE DRAWINGS

In the accompanying drawings.

DESCRIPTION OF THE INVENTION

Figure 1:
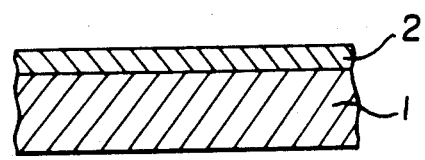
FIG. 1 is a view illustrating the magnetic recording medium of the present invention.

Various types of Co-containing $\gamma$-$Fe_2O_3$ and other Co-containing oxides are known. The present inventors have found that when used individually, these materials hardly satisfy the requirements for the light transmittance and the electromagnetic characteristics at the same time, but when two types of magnetic powders are properly combined and the surface area of the powders are properly selected, it is possible to present a magnetic recording tape having a low light transmittance and good electromagnetic characteristics, particularly an excellent S/N ratio. Namely, the present inventors first studied cobalt-type $Fe_2O_3$ and $Fe_3O_4$, and found that Co-doped type had poor thermal stability, thus leading to a difficulty in the magnetic characteristics. Then, Co-adsorbed acicular $\gamma$-$Fe_2O_3$ having a particle size of at least 25 m²/g as represented by the surface area measured by BET method, was used, whereby it was found that the thermal stability was good, but it was thereby impossible to adequately lower the light transmittance. Then, Co-adsorbed acicular $Fe_3O_4$ having a particle size of at least 25 $m^2/g$ as a BET value, was added, whereby it was found possible to adequately lower the light transmittance without deteriorating the magnetic characteristics, and yet the thermal stability was good. It has been further found that such effects are obtainable when the weight ratio of the above-mentioned Co-adsorbed $Fe_3O_4$ to Co-adsorbed $\gamma$-$Fe_2O_3$ is from 40:60 to 80:20.

The present invention provides a magnetic recording medium comprising a transparent support and a magnetic layer formed on the support, said magnetic layer comprising Co-adsorbed $Fe_3O_4$ and Co-adsorbed $\gamma$-$Fe_2O_3$ in a weight ratio of from 40:60 to 80:20, each of said Co-adsorbed $Fe_3O_4$ and Co-adsorbed $\gamma$-$Fe_2O_3$ having a particle size of at least 25 $m^2/g$ as a BET value.

The present invention will now be described in detail with reference to the preferred embodiments.

DESCRIPTION OF THE PREFERRED EMBODIMENTS

According to the present invention, it is possible to minimize the transmitted light through the magnetic recording medium, whereby it is possible to prevent an accident such as accidental stopping of the magnetic recording medium during its running operation, and at the same time, it is possible to provide a magnetic recording medium having excellent magnetic characteristics such as the S/N ratio.

If the above-mentioned Co-adsorbed $Fe_3O_4$ is less than 40% by weight relative to the total amount of the magnetic powder, the reduction of the light transmission will be inadequate, and if the amount exceeds 80% by weight, the erasure rate tends to increase as time passes, thus indicating a deterioration of the thermal stability.

The present invention will now be described in further detail with reference to Examples. However, it should be understood that the present invention is by no means restricted by these specific Examples.

EXAMPLES:

About 100 parts by weight of a mixture (Co content: about 3% by weight) of Co-adsorbed $Fe_3O_4$ and Co-adsorbed $\gamma$-$Fe_2O_3$, about 10 parts by weight of a vinyl chloride-vinyl alcohol copolymer, about 10 parts by weight of a polyurethane elastomer, about 5 parts by weight of carbon, about 1.5 parts by weight of a fatty acid having from 12 to 20 carbon atoms, about 0.5 part by weight of a fatty acid ester having 18 carbon atoms, about 2.0 parts by weight of $\alpha$-$Al_2O_3$, and about 200 parts by weight of a mixture of methyl ethyl ketone, toluene and methyl isobutyl ketone, were thoroughly dispersed and mixed in a ball mill. Then, about 4.5 parts by weight of a polyisocyanate such as Colonate L was added thereto. The mixture was coated on a polyester film 1 having a thickness of about 11 to about 15 $\mu$m to form a magnetic layer 2. Then, the coated layer was cured at about 60° C. for 24 hours. Then, the film was cut with a width of $\frac{1}{2}$ inch to obtain a magnetic tape with a magnetic layer 2 having a thickness of about 3 to 7 $\mu$m.

Figure 2:
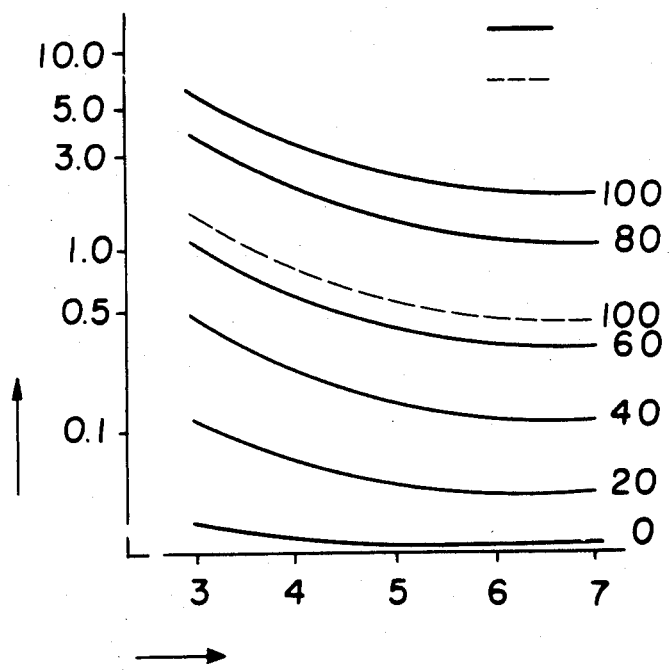
FIGS. 2 and 3 are graphs showing the quantities of transmitted lights through magnetic recording media.
Figure 3:
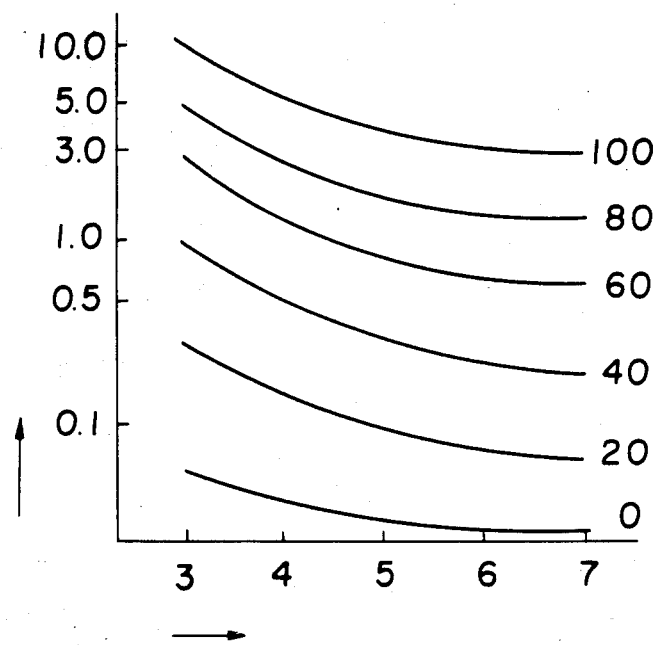

The magnetic tape thus obtained was mounted on a magnetic recording and reproducing device and tested to see if the magnetic tape stops running during its running operation. Namely, a light was applied to the magnetic tape, and a photo transistor current corresponding to the quantity of the transmitted light was measured. The results thereby obtained are shown in FIGS. 2 and 3. In these Figures, the numerals represent amounts of Co-adsorbed $\gamma$-$Fe_2O_3$.

As the results, no such an accident as accidental stopping of the running magnetic tape due to excessive transmitted light, occurred with magnetic tapes wherein the magnetic layer had a thickness of from about 3 to about 7 $\mu$m, and the weight ratio of the Co-adsorbed $Fe_3O_4$ to Co-adsorbed $\gamma$-$Fe_2O_3$ was at least about 40/60.

Whereas, in the case where the particle size of the magnetic powder was greater than about 25 $m^2/g$ as a BET value, and the content of the Co-adsorbed $Fe_3O_4$ was less, the quantity of light transmitting through the magnetic tape increased, and accidental stopping of the running magnetic tape took place.

Thus, it is possible to prevent an accident such as accidental stopping of the running magnetic tape due to excessive transmitted light by incorporating at least about 40% by weight of the Co-adsorbed $Fe_3O_4$ magnetic powder relative to the total amount of the magnetic powder.

Figure 4:
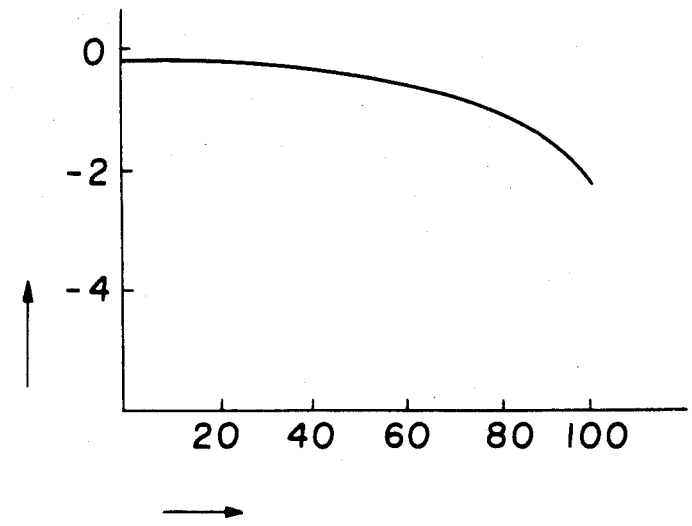
FIG. 4 is a graph showing the change in the erasure rate upon expiration of 100 hours at 60° C.

Then, after recording information on these magnetic tapes, they were left for 100 hours in an environment of 60° C., whereby the erasure rate of the recorded information (erasure rate immediately after the recording being set as 0 dB) was measured. The results are shown in FIG. 4. It is evident from the Figure that when the Co-adsorbed $Fe_3O_4$ exceeds 80% by weight, the erasure rate increases. This indicates a deterioration of the thermal stability. Thus, 80% by weight is the upper limit for the content of the Co-adsorbed $Fe_3O_4$. The magnetic tapes having a magnetic layer of a thickness of from about 3 to about 7 $\mu$m wherein the particle sizes of the magnetic powders are at least 25 $m^2/g$, and the weight ratio of the Co-adsorbed $Fe_3O_4$ to the Co-adsorbed $\gamma$-$Fe_2O_3$ is at least about 40/60, had excellent magnetic characteristics such as a S/N ratio, and an adequate reproduction output was thereby obtained in short wave recording.

As described in the foregoing, the magnetic recording medium of the present invention is obtained by forming on a support a magnetic layer wherein the particle sizes of the magnetic powders are at least 25 $m^2/g$ as a BET value, and the weight ratio of the Co-adsorbed $Fe_3O_4$ to the Co-adsorbed $\gamma$-$Fe_2O_3$ is at least about 40/60, whereby the magnetic characteristics such as the S/N ratio, are far superior to the case where the quantity of light transmitting through the magnetic recording medium is minimized by the incorporation of a substantial amount of carbon powder. In particular, it is thereby possible to obtain an adequate reproduction output in short wave recording. Furthermore, the quantity of light transmitted through the magnetic recording medium can thereby be minimized, and accordingly, even when the magnetic layer is made thin, no such a trouble as accidental stopping of the running magnetic recording medium will be brought about.

We claim:

1. A magnetic recording medium comprising a transparent support and a magnetic layer formed on the support, said magnetic layer comprising Co-adsorbed $Fe_3O_4$ and Co-adsorbed $\gamma$-$Fe_2O_3$ in a weight ratio of from 40:60 to 80:20, each of said Co-adsorbed $Fe_3O_4$ and Co-adsorbed $\gamma$-$Fe_2O_3$ having a particle size of at least 25 $m^2/g$ as a BET value, said magnetic recording media exhibiting reduced accidental stoppage due to light transmittance and enhanced thermal stability.

2. The magnetic recording medium according to claim 1, wherein the magnetic layer has a thickness of from 3 to 7 $\mu$m.

* * * * *